(12) United States Patent
Stanko et al.

(10) Patent No.: US 9,371,835 B2
(45) Date of Patent: Jun. 21, 2016

(54) COUPLING FOR DIRECTLY DRIVEN COMPRESSOR

(71) Applicants: Michael J. Stanko, Grand Island, NY (US); Carl L. Schwarz, East Aurora, NY (US); William J. Owens, Kenmore, NY (US)

(72) Inventors: Michael J. Stanko, Grand Island, NY (US); Carl L. Schwarz, East Aurora, NY (US); William J. Owens, Kenmore, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 511 days.

(21) Appl. No.: 13/946,371

(22) Filed: Jul. 19, 2013

(65) Prior Publication Data

US 2015/0023785 A1    Jan. 22, 2015

(51) Int. Cl.
| | |
|---|---|
| F04D 29/20 | (2006.01) |
| F04D 13/02 | (2006.01) |
| F04D 25/02 | (2006.01) |
| F04D 29/12 | (2006.01) |
| F01D 5/02 | (2006.01) |
| F16D 1/06 | (2006.01) |
| F04D 29/26 | (2006.01) |
| F16D 9/08 | (2006.01) |
| F01D 21/04 | (2006.01) |
| F16D 1/076 | (2006.01) |
| F04D 25/06 | (2006.01) |
| F04D 29/054 | (2006.01) |

(Continued)

(52) U.S. Cl.
CPC ............. *F04D 13/021* (2013.01); *F01D 5/025* (2013.01); *F01D 21/045* (2013.01); *F04D 25/022* (2013.01); *F04D 25/06* (2013.01); *F04D 29/054* (2013.01); *F04D 29/102* (2013.01); *F04D 29/122* (2013.01); *F04D 29/266* (2013.01); *F16D 1/06* (2013.01); *F16D 1/076* (2013.01); *F16D 9/08* (2013.01); *F04D 17/122* (2013.01); *F05D 2220/40* (2013.01)

(58) Field of Classification Search
CPC ..... F04D 13/021; F04D 17/10; F04D 25/022; F04D 29/045; F04D 29/102; F04D 29/122; F04D 29/20; F04D 29/266; F01D 21/045; F01D 5/025; F16D 1/06; F16D 1/076; F16D 9/08; F05D 2260/40
See application file for complete search history.

(56) References Cited

U.S. PATENT DOCUMENTS 2,743,080 A * 4/1956 Feilden ................... F01D 5/066
                                                  416/201 R
2,975,620 A    3/1961 Shipley et al.

(Continued)

FOREIGN PATENT DOCUMENTS

| EP | 0301285 B1 | 10/1991 |
|---|---|---|
| EP | 1 933 061 A1 | 6/2008 |
| GB | 604 730 A | 7/1948 |

*Primary Examiner* — Ninh H Nguyen
(74) *Attorney, Agent, or Firm* — Robert J. Hampsch; David M. Rosenblum

(57) ABSTRACT

A coupling to attach an impeller of a compressor to a shaft of an electric motor. The coupling has a coupling body that is attached at a first of the ends thereof to the impeller and at the opposite second end, to the motor shaft. The coupling body has a deformable section between the first and second ends of the coupling body. The deformable section is configured such that under an unbalanced loading exerted against the coupling body upon a failure of the impeller, the deformable section will permanently deform without the ultimate strength of a material forming the coupling body being exceeded and prior to a permanent deformation of the shaft. In such manner, the electric motor is protected from damage upon a failure of the impeller.

11 Claims, 2 Drawing Sheets

(51) Int. Cl.
  *F04D 29/10* (2006.01)
  *F04D 17/12* (2006.01)

(56) References Cited

U.S. PATENT DOCUMENTS

| | | | | |
|---|---|---|---|---|
| 4,074,946 A | * | 2/1978 | Swearingen | F04D 29/266 |
| | | | | 192/69.8 |
| 4,123,199 A | * | 10/1978 | Shimizu | F01D 5/066 |
| | | | | 416/198 A |
| 4,184,345 A | | 1/1980 | Cutler | |
| 4,639,194 A | * | 1/1987 | Bell, III | F01D 5/025 |
| | | | | 415/216.1 |
| 5,443,372 A | | 8/1995 | Kanoll | |
| 5,536,144 A | * | 7/1996 | Bednarz | F01D 5/025 |
| | | | | 416/198 A |
| 6,464,469 B1 | | 10/2002 | Grob et al. | |
| 7,001,155 B2 | | 2/2006 | Cabrales et al. | |
| 7,014,564 B2 | | 3/2006 | Nakashima | |
| 7,025,560 B2 | | 4/2006 | Clark | |
| 7,144,226 B2 | | 12/2006 | Pugnet et al. | |
| 7,318,685 B2 | | 1/2008 | Bouchy et al. | |
| 7,452,281 B2 | | 11/2008 | Nosaka et al. | |
| 8,403,636 B2 | | 3/2013 | Dakowski et al. | |
| 2004/0022648 A1 | | 2/2004 | Cabrales et al. | |

* cited by examiner

COUPLING FOR DIRECTLY DRIVEN COMPRESSOR

FIELD OF THE INVENTION

The present invention relates to a coupling for a directly driven compressor in which an impeller of a centrifugal compressor is connected to a shaft of an electric motor by the coupling. More particularly, the invention relates to such a coupling that is designed to deform upon failure of the impeller to prevent damage to the electric motor.

BACKGROUND OF THE INVENTION

Centrifugal compressors have wide application in many industries. In cryogenic separation plants compressors are used to separate air into its constituent parts, air is compressed by a multi-stage centrifugal compressor and then cooled to a temperature suitable for the distillation of the air. The air, after having been cooled is rectified in a distillation column to produce nitrogen, oxygen and argon products. In such plants, centrifugal compressors are also employed as product compressors to compress product nitrogen gas and product oxygen gas.

Although in any compression application, it is possible to compress the gas in a single stage, in many industries, including the cryogenic air separation industry, it is more common to compress the gas in sequential compression stages, particularly when the discharge pressure is higher than one and half times the inlet pressure. The reason for this is as the gas is compressed, its temperature rises and the elevated gas temperature requires an increase in power to compress the gas. Where the gas is compressed in stages and cooled between stages, the compression power requirement is reduced due to closer to isothermal compression compared to compression without interstage cooling. In a typical compressor installation, each stage uses a centrifugal compressor in which gases entering an inlet to the compressor are distributed to a vaned compressor wheel known as an impeller that rotates to accelerate the gas and thereby impart the energy of rotation to the gas. This increase in energy is accompanied by an increase in velocity and a pressure rise. The pressure is recovered in a static vaned or vaneless diffuser that surrounds the impeller and functions to decrease the velocity of the gas and thereby increase the pressure of the gas.

The individual compressors of the compression stages of a multi-stage compressor can be driven by a common driver, such as an electric motor driving an integral gearbox. However, in one type of compressor assembly, a compressor stage is directly connected to the electric motor such as a permanent magnet electric motor without gearing. The direct coupling of the compressor and the electric motor overcomes the inefficiencies inherent in a gear box arrangement in which thermal losses occur within the gearing between the electric motor and the compressor. Such a direct coupling is known as a direct drive compressor assembly where both electric motor shaft and the impeller rotate at the same speed. Typically such electric motors are capable of variable speed operation. A directly driven compressor can thereby be operated to deliver a range of flow rates through the compressor and a range of pressure ratios across the compressor by varying the driver speed.

Direct drive compressor assemblies can be configured, for example, by installing a compressor impeller on one end of a shaft of an electric motor. The compressor impeller and the motor rotor rotate at the same speed. It is also possible that a direct drive compressor assembly contains two or more compressor impellers driven by a common motor, and installed on opposite ends of the same shaft of the electric motor. It is also possible that a single motor drives two compressors connected at one end of the electric motor shaft. Several permutations and combinations are possible for configuring a direct drive compressor assembly depending on the number of compressor impellers, motor, and any other rotatable driver or driven device installed on the common shaft.

A prevalent failure mode in a direct drive compressor assembly is the impeller which may experience a crack and then lose a portion of blading. The loss of blading usually creates very significant unbalance forces which must be reacted by the rotor and its bearing system. The unbalance in the loading on the motor shaft will be produced because the mass of the rotating impeller is not equally distributed in a radial direction of the impeller. In other words, a force will be produced due to the unequal distribution of mass and the rotation of the impeller that will act at right angles to the shaft. As a result of such unbalance loading, the motor shaft will experience additional forces and moments with the support bearings having to react to these additional unbalance loads which can lead to a failure of radial bearings used in the electric motor. These bearings can be oil lubricated bearings or foil or electromagnetic bearings that support the motor shaft both in rotation and in an axial direction and back-up bearings that support the motor shaft in case of a failure of the foil or electromagnetic bearings. In any event, the failure of such bearings will lead to complete destruction of the electric motor.

Aside from impeller blade cracking, other abnormal operating conditions that can create very significant unbalance forces include impeller cracking in non-bladed areas, erosion of impeller material, deposition of fouling products or foreign debris in the impeller, and the unintended loosening of parts on the impeller end of the common rotating shaft. This list is not meant to be a comprehensive list and those experienced in the art would recognize other abnormal operating conditions that can create very large unbalanced forces and moments that if remain unchecked could result in permanent deformation of the motor shaft.

In the prior art, break-away assemblies have been used in various devices using compressors to contain structural failures of an impeller and to prevent damage to associated equipment. For instance, in U.S. Pat. No. 7,001,155, a supercharger is provided in which a compressor, connected to an exhaust gas driven turbine, is provided with an impeller that has a threaded bore extending through the impeller hub to engage with a threaded end of a drive shaft. The impeller bore is provided with an enlarged portion that produces a thin wall section of the impeller hub that will fracture before the threads within the bore will strip. This ensures that any failure of the impeller will leave the hub intact and connected to the shaft to contain the failure and thereby to prevent damage to the engine. In U.S. Pat. No. 5,443,372, an automotive air conditioning compressor has coupling plate members that include portions which may be easily broken or fractured under a predetermined amount of torque or other applied mechanical force to also prevent engine damage.

In a compressor assembly such as in an air separation plant, the electric motor driving the compressor is typically a very powerful device consuming perhaps 0.1 to 50 megawatts of power. Consequently, the torque transmitted by the electric motor to the compressor impeller requires a coupling between the motor shaft and the impeller that is sufficiently robust to allow such torque to be transmitted. Consequently, prior art breakaway solutions, such as have been discussed above, are not applicable to industrial compressor applications that involve high levels of power transmission between the motor shaft and the impeller.

As will be discussed, unlike the prior art breakaway solutions, the present invention provides a coupling that will allow the impeller to fail before the electric motor shaft from being damaged as a result of an impeller failure and resulting very large unbalance loads.

SUMMARY OF THE INVENTION

The present invention provides a coupling to attach an impeller of a compressor to a shaft of an electric motor that is provided with a coupling body having opposite first and second ends. A means is provided for attaching the coupling body at the first of the ends to the impeller and a means is provided for attaching the coupling body at the second of the ends to the shaft. The coupling body has a deformable section between the first and second ends configured such that the deformable section will permanently deform under an unbalanced loading exerted against the coupling body upon a failure of the impeller without exceeding the ultimate strength of a material forming the coupling body and prior to permanent deformation of the shaft as well as potentially prior to a failure of radial bearings supporting the shaft within the electric motor. As used herein and in the claims, the term, "unbalanced loading" means a loading that in addition to a shear loading, a force is exerted at right angles to the axis of the coupling body that would induce bending of the motor shaft. This unbalanced loading causes at least a section of the coupling body to deform when the loading is greater than the elastic limit but less than the ultimate yield point of the material forming the coupling body. As described above, such an unbalanced loading could be produced as a result of an impeller failure causing the mass of the impeller to not be equally distributed in a radial direction thereof, such as created by unbalance in the impeller due to cracked or missing portions of failed vanes.

As can be appreciated, since the deformable section of the coupling body will permanently deform without failure of the coupling itself or the motor bearings, the failure of the impeller will not cause permanent deformation of the motor shaft and potentially the bearings with the force and moments of the unbalanced loading being limited by what the coupling body can transmit. In this regard, a permanent deformation is one in which the elastic limit of the material is exceeded. Practically, the impeller will fail within the compressor before such damage occurs. At the same time, since such deformation occurs before failure of the coupling body itself, the coupling body will be sufficiently strong to transmit torque to the impeller.

The coupling body can be provided with an axial bore having a portion sized such that the coupling body has a reduced wall thickness at one location along the length of the coupling body as compared to the wall thickness of a remainder of the coupling body to form the deformable section. The axial bore can extend from the first to the second of the ends of the coupling body and portion of the axial bore is a wider portion thereof that inwardly extends from the second of the ends toward the first of the ends and a narrower portion of the axial bore extends from the wider portion to the first of the ends of the coupling. In such case, the means for attaching the coupling body to the shaft can be an annular flange-like section of the coupling body surrounding the wider portion of the axial bore and a set of preloaded screws connecting the annular flange-like section to the shaft at an end thereof. Further, the means for attaching the coupling body to the impeller is a preloaded stud retained in the narrower portion of the axial bore by means of a threaded type connection and a tooth-like engagement between the first of the ends of the coupling body and the impeller.

Preferably, the end of the shaft can have a cylindrical, inwardly extending recess and the coupling body can have an annular projection extending from the annular flange-like portion sized to seat within the cylindrical, inwardly extending recess located at the end of the shaft to center the coupling body with respect to the shaft. Further, the coupling body can be provided with a pair of spaced labyrinth seal elements, typically needed on centrifugal compressor for managing process gas leakage, located on exterior portions of the annular flange-like section and the first of the ends of the coupling body and configured to engage complimentary labyrinth seal elements situated on the shaft seal within a housing of the electric motor adjacent to the impeller.

BRIEF DESCRIPTION OF THE DRAWINGS

While the specification concludes with claims particularly pointing out the subject matter that applicants regard as their invention, it is believed that invention will be better understood when taken in connection with the accompanying drawings in which:

DETAILED DESCRIPTION

Figure 1:
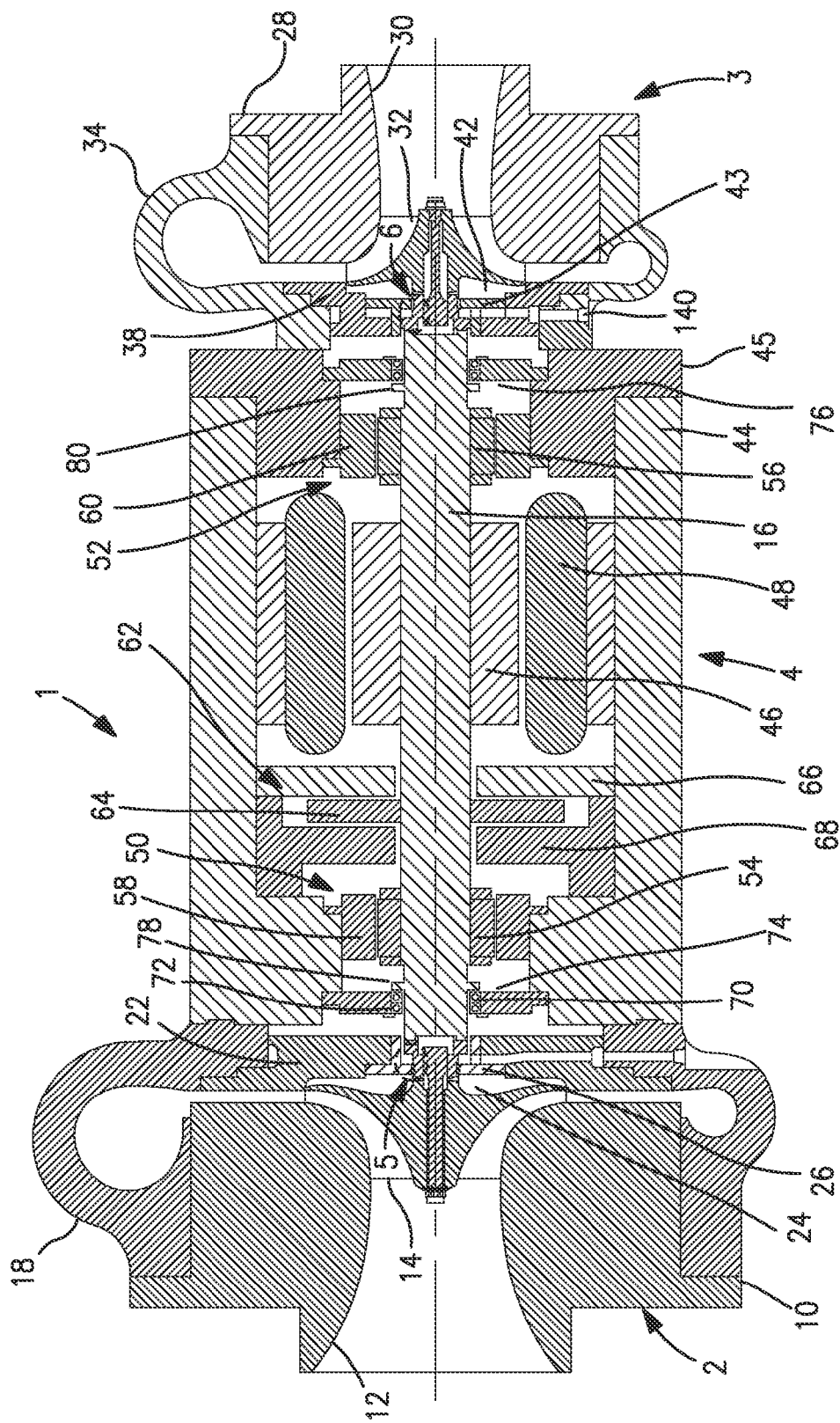
FIG. 1 is a schematic, sectional view of a compression system in accordance with the present invention that incorporates two compression stages.

With reference to FIG. 1, a compression system 1 is illustrated having two successive compression stages provided with two compressors 2 and 3, respectively, that are driven by an electric motor 4. Compressors 2 and 3 are centrifugal compressors. Compressor 2 compresses a gas, for instance air, from a low pressure to an intermediate pressure and compressor 3 further compresses the gas from the intermediate pressure to a yet higher pressure. Consequently compressor 3 has a higher outlet pressure than compressor 2. Although not illustrated, compressor 2 would be connected to compressor 3 by a suitable conduit and depending on the application of compression system 1 could incorporate interstage cooling. As will be discussed, the compressors 2 and 3 have impellers 14 and 32 that are connected to opposite ends of a motor shaft 16 of the electric motor 4 by means of couplings 5 and 6 in accordance with the present invention.

Although the invention will be discussed in connection with the compression system 1, it is understood that this is for exemplary purposes only and the present invention has equal application to a compression system having a single compressor. Furthermore, this invention has equal applicability with a turbine stage or stages driving a generator or with a turbine and a compressor stage driving a generator, or a compressor stage driven by a motor.

Compressor 2 includes a shroud 10 having an inlet 12 and the impeller 14 that is driven by the motor shaft 16 of the electric motor 4. As mentioned above, the motor shaft 16 and the impeller 14 are connected by means of the coupling 5. The gas is driven by impeller 14 into a volute 18 from which the gas is expelled at a higher pressure than the gas entering compressor 2 from inlet 12. Although not illustrated, a conventional outlet in the volute 18 is provided for discharging the gas at such higher pressure. A cavity 24 is formed behind the impeller 14 and the motor shaft 16. A shaft seal 26 provides a seal about the motor shaft 16 thereby also sealing the cavity 24. Shaft seal 26 is held in place by seal holder 22.

Compressor 3 is provided with a shroud 28 having an inlet 30 that is in flow communication with an outlet (not shown) of the volute 18 of the compressor 2 from which gas is discharged at an intermediate pressure. As indicated above, an interstage cooler could be provided between the outlet of the volute 18 and the inlet 30. The impeller 32 is driven by the motor shaft 16 of the electric motor 4 at the opposite end thereof to the end at which impeller 14 is driven. As also mentioned above, the motor shaft 16 and impeller 32 are connected to only another by means of a coupling 6. The gas is driven by impeller 32 into a volute 34 and expelled at a higher pressure than the gas entering compressor 3 from inlet 30. Although not illustrated, a conventional outlet in the volute 34 is provided for discharging the gas at such higher pressure. A cavity 42 is formed behind the impeller 32 and the motor shaft 16. A shaft seal 43 provides a seal about the motor shaft 16 and therefore also seals cavity 42. Shaft seal 43 is held in place by a seal holder 38.

The shroud 10 is connected to the volute 18 which is in turn connected to one end of a cylindrical motor casing 44. The shroud 28 is connected to the volute 34 which is in turn connected to a motor cap 45. Motor cap 45 is connected to the opposite end of cylindrical casing 44. The electric motor 4 has a rotor 46 attached to motor shaft 16 and a stator 48 attached to the inside of cylindrical motor casing 44. The motor shaft 16 is supported at opposite ends by journal bearings 50 and 52. If journal bearings 50 and 52 are active magnetic bearings, then conductors 54 and 56 are attached to the motor shaft 16 and electromagnets 58 and 60 are connected to the cylindrical motor casing 44 and the motor cap 45, respectively. The journal bearings 50 and 52 electromagnetically suspend, support the motor shaft 16 radially allowing for rotational movement. An electromagnetic thrust bearing 62 is also provided. Thrust bearing 62 has a disk-like thrust runner 64 that is connected or part of shaft 16. If thrust bearing 62 is an active magnetic bearing, thrust runner 64 is a conductor that rotates between inboard and outboard electromagnetic components 66 and 68 that suspend the disk-like thrust runner 64 between the inboard and outboard components. The thrust bearing 62 supports the motor shaft 16 axially allowing rotational movement. If active magnetic bearings are used (not shown), but as would be well known in the art, gap sensors are provided with associated electronics to differentially power the electromagnets to maintain the gaps between conductors 54 and 56 and the electromagnets 58 and 60 and the disk-like thrust runner 64 between its associated electromagnets of the outboard and inboard components 66 and 68. The ability to maintain the gaps by active magnetic bearings is not without force limit. This force limit can be exceeded during a surge event. Consequently, as a backup, two sets of anti-friction bearings or bushings 70 and 72 are provided that are connected to the cylindrical motor casing 44 and the motor cap 45 by plates 74 and 76. During a power loss or upon startup or after shutdown, bushings 70 and 72 will radially support the motor shaft 16. End elements 78 and 80 connected to motor shaft 16 that are of ring-like configuration contact the bushings 70 and 72 should the axial force on the motor shaft 16 exceed the capability of the thrust bearing 62. This can occur during a surge event and such axial forces imparted to motor shaft 16 through bushings 70 and 72 can be particularly severe. As such the number of surge events that the motor bushings 70 and 72 can be subjected to will be limited to a small number of events.

During operation of the compression system 1, the stator 48 produces a magnetic field that rotates the rotor 46 and thus shaft 16 at a desired speed and with a desired torque. The torque created is primarily transmitted to impellers 14 and 32 through couplings 5 and 6, respectively.

Figure 2:
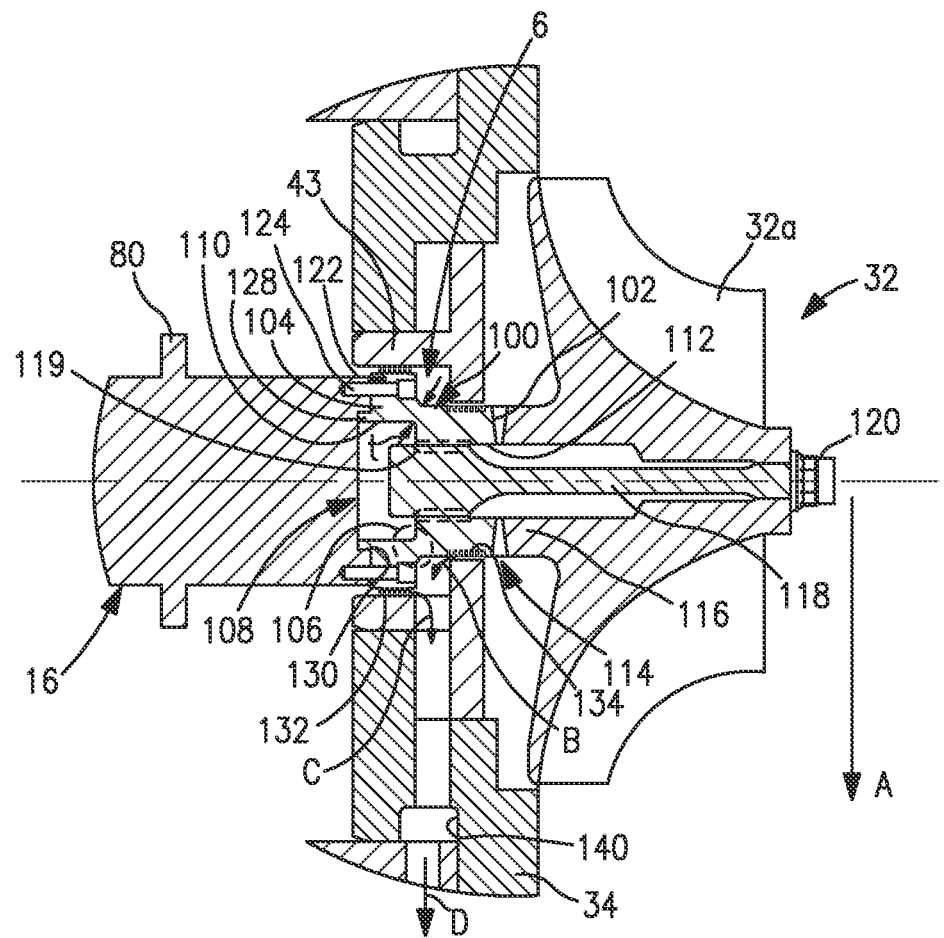
FIG. 2 is a schematic, fragmentary view of FIG. 1 that illustrates coupling and associated features and details.

With reference to FIG. 2, coupling 6 in accordance with the present invention is illustrated. It is understood that coupling 5 would contain the same elements as those discussed below in connection with coupling 6. Coupling 6 is designed to safeguard the electric motor 4 from failures of the impeller 32 that would result in ultimate destruction of the motor 4. Specifically, a typical impeller failure could be due to the separation of a blade 32*a* of impeller 32. The result of this would be an unbalanced loading or in other words a force shown acting in the direction indicated by arrowhead "A". This force would act opposite to the separated blade 32*a* due to the resulting off-center center of mass of the impeller 32 and the rotation of the impeller 32 producing acceleration of such mass outwardly and at right angles to the rotation of the impeller 32 and rotating with the impeller 32. If a failure such as the foregoing were left unchecked, a moment created by force "A" would cause a failure of the journal bearings 50 and 52 with the effect of the motor shaft both bending and producing contact with the two sets of anti-friction bearings or bushings 70 and 72 and the shaft 16 in these locations. Since these bushings 70 and 72 have a very limited life cycle and are designed for use in connection with the starting and shutdown of the motor 4 when the magnetic bearings 50 and 52 are not operational due to a failure, these bushings and elements will rapidly fail, cause the rotor 46 to come in contact with the stator 48 and the inevitable complete destruction of the motor 4. It is understood that other types of failures of impeller 32 such as impeller cracking in non-bladed areas, erosion of impeller material, deposition of fouling products or foreign debris in the impeller, and the unintended loosening of parts on the impeller end of the common rotating shaft could produce an unbalanced loading that could result in permanent deformation of the shaft 16.

Coupling 6 safeguards the motor 4 in such an event as that described above by undergoing a partial failure through a planned permanent deformation of deformable section 106 allowing the impeller 32 to contact the shroud 28 wherein impeller 32 is retained and thereby limiting the unbalanced load force and moment which would permanently deform the motor shaft 16 or possibly fail the magnetic and its backup bearings 50, 52, 70 and 72. As illustrated, the coupling 6 is provided with a coupling body 100 which includes opposed first and second ends 102 and 104. The coupling 6 is connected at the first of the ends 102 to the impeller 32 and at the second of the ends 104 to the motor shaft 16. The coupling body 100 has a deformable section 106 highlighted in the dashed circle that will deform under a desired unbalanced loading exerted against the coupling body upon failure of the impeller 32 allowing it to permanently deform and do so without the deformable section 106 exceeding the ultimate strength of a material forming the coupling body 100 and to limit the unbalanced load force and moment to prevent permanently deforming the motor shaft 16 and which can result in a failure of the journal bearings 50 and 52. In this regard, such a material could be a high ductility metal, with yield strength sufficiently large to handle normal design loads, yet sufficiently low to limit unbalanced load forces and moments from permanently deforming the motor shaft, meanwhile the combination of elastic and ultimate strength allow the impeller 32 to touch the shroud 28 without cracks occurring in the coupling 6. Such a material could be 15-5PH (H1150) stainless steel.

As illustrated, the section 106 has a sufficiently large annular shaped area, as viewed in an outward radial direction thereof (the same direction as arrowhead "A"), that with a given material is sufficient to transmit the torque from the motor shaft 16 to the impeller 32 during normal intended operation. It is also a short section as viewed in an axial direction parallel to the motor shaft 16 so as to be sufficiently stiff as not to allow undesirable motor shaft vibrations during such normal operation. However, in case of a failure of the impeller 16, the section 106 is designed to undergo a stress that will exceed the elastic limit of the material making up the coupling 6 and thereby deform without exceeding the ultimate strength or ultimate limit of such material. As a result of such deformation the first of the ends 102 of the coupling 6 will begin to rotate in a clockwise direction due to the force "A" with the end result of the impeller 32 striking the shroud 28 of compressor 3. Put another way, the coupling 6 sacrifices itself by yielding in section 106 for the sake of the motor 4. After a failure of the coupling 6, the motor 4 will not have a permanently deformed shaft 16 and potentially have reusable bearings 50, 52, 70 and 72. The motor will still be able to be used and the arrangement can be renewed by refurbishment of the compressor.

The section 106 is produced by providing the coupling body 100 with an axial bore 108 that has a wider portion 110 inwardly extending from the second of the ends 104 toward the first of the ends 102 and a narrow portion 112 extending from the wider portion 110 toward the second of the ends 102. This results in the coupling body having a reduced wall thickness "t" at a location along axial bore 108 that will act as a weak point at which the coupling body 100 will deform. Thus, the deformable section 106 forms a juncture between the wider and narrower portions 110 and 112 of the axial bore 108. In order to design such a section, as a first step, a failure mode of the impeller 32 must be forecasted that will produce damage to the motor 4, either in the shaft 16 or in bearings 50, 52, 70 and 72. Typically, as described above, this failure will be due to the loss or partial loss of an impeller blade 32a. The deformable section is then designed to fail or in other words deform as a result of a certain imbalance and under a loading produced at an operational motor speed. At the same time sufficient cross-sectional area must be provided to allow torque transmission and vibration during normal operation as described above. As can be appreciated, other designs could be used in producing deformable section. For example, if the axial bore 108 were of constant diameter, an outer circumferential groove-like portion within the coupling body 100 could produce such a deformable section.

The connection between impeller 32 and the coupling 6 is a clutch type toothed coupling 114 provided by an interlocking arrangement of teeth. The teeth are provided both at the first of the ends 102 of the coupling body 100 and also on a hub 116 of the impeller 32. This clutch type toothed coupling has many variations and names but, is typically referred to as a "HIRTH" type of coupling. In order to maintain contact and provide torque transmission, a preloaded stud 118 can be connected to coupling 6 by a threaded type connection 119 within the narrower section 112 of the axial bore 108 of the coupling body 100. A nut 120 threaded onto the stud 118 holds the hub 116 of the impeller 32 against the first of the ends 102 of the coupling body 100 and therefore, the clutch type toothed coupling 114 in engagement. As can be appreciated by those skilled in the art, numerous other means could be provided for connecting the impeller 32 to the coupling 6, for instance a friction, keyed, polygon, or interference fit.

The connection between motor shaft 16 and the second of the ends 104 of the coupling 6 is provided by an annular flange-like section 122 of the coupling body 100 surrounding the wider portion 110 of the axial bore 108. A set of preloaded screws 124 pass through the flange-like section 122 and are threadably engaged within bores (not shown) provided in the end of the motor shaft 16. Other means for accomplishing such connection include a HIRTH type of coupling or a threaded, friction, polygon, or interference fit. Preferably the coupling body 100 has an annular projection 128 that seats within a cylindrical, inwardly extending recess 130 situated at the end of the motor shaft 16 to center the coupling body 100 with respect to the motor shaft 16. This provides better centering of impeller 32 with shaft 16 and helps in the assembly thereof Preferably, rotating labyrinth seal elements 132 and 134 are part of the coupling 6 and as illustrated, are provided on exterior portions of the annular flange-like section 122 and the first of the ends 102 of the coupling body 100. These elements engage complimentary labyrinth seal elements situated on the shaft seal 43 within a housing of the electric motor 4 adjacent the impeller 32. By placing both the necessary process gas shaft seal and the rotor air gap cooling stream shaft seal on the coupling, impeller overhang is minimized and the chances of creating a rigid rotor and preferable rotor dynamics is allowed. The seals, while typically rotating labyrinths, could be a brush or carbon ring seal. A secondary benefit of minimizing impeller overhang is that should damage to the seals occur, which can occasionally happen, only the coupling needs replacing. This is in contrast to seals typically located on the rotor which would need renovation or replacement.

Shaft seal 43 forms the stationary sealing surfaces between rotating labyrinth seals 132 and 134 which control the motor cooling gas leakage flow and compressor process gas leakage flow as depicted by arrowheads "B" and "C", respectively. Leakage flows "B" and "C" combine to form a total leakage flow shown by arrowhead "D" which exits from a passage 140 in volute 34.

Although the present invention has been described with reference to preferred embodiments, as would occur to one skilled in the art, numerous changes, additions and omission can be made without departing from the spirit and scope of the present invention as set forth in the appended claims.

We claim:

1. A coupling to attach an impeller of a compressor to a shaft of an electric motor, said coupling comprising:
    a coupling body having opposite first and second ends;
    means for attaching the coupling body at the first of the ends to the impeller; and
    means for attaching the coupling body at the second of the ends to the shaft;
    wherein the coupling body has a deformable section between the first and second ends configured such that the deformable section will permanently deform under unbalanced loading exerted against the coupling body upon a failure of the impeller without the ultimate strength of a material forming the coupling body being exceeded and prior to a permanent deformation of the shaft;
    wherein the coupling body has an axial bore having a portion sized such that the coupling body has a reduced wall thickness at one location along the length of the coupling body as compared to the wall thickness of a remainder of the coupling body to form the deformable section.

2. The coupling body of claim 1, wherein:
    the axial bore extends from the first to the second of the ends of the coupling body;
    the portion of the axial bore is a wider portion thereof that inwardly extends from the second of the ends toward the first of the ends and a narrower portion of the axial bore extends from the wider portion to the first of the ends of the coupling;

the means for attaching the coupling body to the shaft is an annular flange-like section of the coupling body surrounding the wider portion of the axial bore and a set of preloaded screws connecting the annular flange-like section to the shaft at an end thereof; and the means for attaching the coupling body to the impeller is a preloaded stud retained in the narrower portion of the axial bore by means of a threaded type connection and a tooth-like engagement between the first of the ends of the coupling body and the impeller.

3. The coupling body of claim 2, wherein:

the end of the shaft has a cylindrical, inwardly extending recess; and the coupling body has an annular projection extending from the annular flange-like portion sized to seat within the cylindrical, inwardly extending recess located at the end of the shaft to center the coupling body with respect to the shaft.

4. The coupling body of claim 2, wherein the coupling body has a pair of spaced labyrinth seal elements located on exterior portions of the annular flange-like section and the first of the ends of the coupling body configured to engage complimentary labyrinth seal elements situated on a shaft seal within a housing of the electric motor adjacent to the impeller.

5. The coupling body of claim 3, wherein the coupling body has a pair of spaced labyrinth seal elements located on exterior portions of the annular flange-like section and the first of the ends of the coupling body configured to engage complimentary labyrinth seal elements situated on a shaft seal within a housing of the electric motor adjacent to the impeller.

6. A compression system comprising:

at least one compressor having an impeller;

an electric motor having a motor shaft coupled to the impeller and configured for driving the impeller of the compressor; and a coupling body having a first end attached to the impeller and a second end attached to the motor shaft;

wherein the coupling body has a deformable section between the first end and the second end configured such that the deformable section will permanently deform under unbalanced loading exerted against the coupling body upon a failure of the impeller without the ultimate strength of a material forming the coupling body being exceeded and prior to a permanent deformation of the motor shaft;

wherein the coupling body has an axial bore having a portion sized such that the coupling body has a reduced wall thickness at one location along the length of the coupling body as compared to the wall thickness of a remainder of the coupling body to form the deformable section.

7. The compression system of claim 6 wherein the at least one compressor further comprises a first compressor having a first impeller coupled to one end of the motor shaft and a second compressor having a second impeller coupled to the other end of the motor shaft.

8. The compression system of claim 6 wherein the coupling body further comprises:

an annular flange-like section surrounding the portion of the axial bore;

a set of preloaded screws connecting the annular flange-like section to the motor shaft at an end thereof; and a preloaded stud retained in the axial bore by a threaded type connection and a tooth-like engagement between the first end of the coupling body and the impeller.

9. The compression system of claim 8 wherein:

the axial bore of the coupling body extends from the first end of the coupling body to the second end of the coupling body;

the portion of the axial bore further comprises a wider portion that inwardly extends from the second end toward the first end and a narrower portion that extends from the wider portion to the first end of the coupling body;

wherein the annular flange-like section of the coupling body surrounds the wider portion of the axial bore and the preloaded stud is retained in the narrower portion of the axial bore.

10. The compression system of claim 9, wherein:

the end of the motor shaft has a cylindrical, inwardly extending recess; and the coupling body has an annular projection extending from the annular flange-like portion sized to seat within the cylindrical, inwardly extending recess located at the end of the motor shaft to center the coupling body with respect to the motor shaft.

11. The compression system of claim 9, wherein the coupling body has a pair of spaced labyrinth seal elements located on exterior portions of the annular flange-like section and the first of the ends of the coupling body configured to engage complimentary labyrinth seal elements situated on a shaft seal within a housing of the electric motor adjacent to the impeller.

* * * * *